United States Patent

[11] 3,618,912

| [72] | Inventors | Vlastimil Braun;<br>Otto Vitek, both of Brno, Czechoslovakia |
|---|---|---|
| [21] | Appl. No. | 795,474 |
| [22] | Filed | Jan. 31, 1969 |
| [45] | Patented | Nov. 9, 1971 |
| [73] | Assignee | Kralovoposlka Strojirna Zavody chemickych zarizehi Klementa Gottwald, norodni podnik<br>Brno, Czechoslovakia |
| [32] | Priority | June 27, 1964 |
| [33] | | Czechoslovakia |
| [31] | | 3701-64 |
| | | Continuation-in-part of application Ser. No. 464,982, June 18, 1965, now abandoned. |

[54] TRAY FOR GAS AND LIQUID CONTACT TOWER
7 Claims, 8 Drawing Figs.

[52] U.S. Cl. .................................................. 261/114 VT, 137/533.17
[51] Int. Cl. ........................................................ B01f 3/04
[50] Field of Search ............................................ 261/109, 114, 113, 114 VT, 114.1, 114.1 P; 137/533.17

[56] References Cited
UNITED STATES PATENTS

| 2,710,177 | 6/1955 | Young et al. .................. | 261/114 |
| 2,846,204 | 8/1958 | Gilmore ........................ | 261/114 |
| 2,951,691 | 9/1960 | Nutter .......................... | 261/114 |
| 2,979,316 | 4/1961 | Houston, Jr. .................. | 261/114 |
| 3,080,155 | 3/1963 | Glitsch et al. ................. | 261/114 |
| 3,116,989 | 1/1964 | Warren ......................... | 261/113 |
| 3,146,280 | 8/1964 | Forgrieve ..................... | 261/114 |
| 3,333,836 | 8/1967 | Bahout ......................... | 261/114 |
| 3,417,975 | 12/1968 | Williams et al. .............. | 261/114 |
| 3,445,095 | 5/1969 | Braun et al. .................. | 261/114 |

FOREIGN PATENTS

| 645,354 | 7/1962 | Canada ........................ | 261/114 VT |

Primary Examiner—Tim R. Miles
Attorney—Richard Low

ABSTRACT: A tray for gas or vapor and liquid contact towers has elongated slots. An elongated cap covers either a single slot or two or more aligned slots. The caps have a rooflike profile or any suitable curved configuration. Each cap is provided with a longitudinally extending single row of longitudinally spaced depending members each of which extends transversely of the respective cap and downwardly through the respective slot. There is an abutment means on the depending members to limit the upward movement of the cap.

PATENTED NOV 9 1971 3,618,912

INVENTORS
Vlastimil Braun, Otto Vitek
By Richard Low
Ag't

TRAY FOR GAS AND LIQUID CONTACT TOWER

CROSS-REFERENCE TO RELATED APPLICATION

This application is a continuation-in-part of our copending application Ser. No. 464,982, filed June 18, 1965, entitled Slotted Fractionating Column Tray, now abandoned.

BACKGROUND OF THE INVENTION

This invention relates to gas or vapor- and liquid-contacting towers and more particularly to trays and valve-type cap structures for such towers. Fluid contact towers are used, for instance, in the petroleum, petrochemical, and chemical industries for bringing a stream of gases and/or vapors and a stream of liquid into intimate countercurrent contact.

A contact tower is usually provided with a series of trays which are equally spaced apart. The tower is vertically, the trays therein are horizontally, arranged. Each fluid contact tray has a multiplicity of flow passages therethrough for providing substantially uniform distribution of an ascending fluid and thorough mixing of said fluid with a liquid on the tray. Intimate contact and thorough mixing of the ascending fluid and the liquid have great importance in operations such as, for instance, fractional distillation of fluid mixtures, absorption of gases in liquids, stripping of volatile components from liquids.

In normal operations of downcomer type towers, the liquid flows downwardly from tray to tray and horizontally across each tray. A predetermined level of the liquid is maintained on each tray. The referred to caps coact with the liquid-supporting trays to control the flow of vapors and/or gasses upwardly through the tower, while the liquid flows downwardly, to bring the fluids in contact with each other and to cause the ascending fluid to be thoroughly mixed with the liquid carried by the trays, thus effecting heat exchange and mass exchange actions between the fluids.

SUMMARY OF THE INVENTION

The primary object of our present invention is to provide a simple, efficient, and economical control means composed of a minimum number of parts and which automatically regulates, in accordance with differential ranges of pressure on the two sides of each tray, the upward flow of gas or vapor through openings or flow passages in the trays of a contact tower. The control means generally includes a plurality of one-piece self-retaining valves each of which normally closes a single or several flow passages in a tray.

The invention aims at a uniform type of tray which will permit the tray to be economically produced and the tower to be easily assembled and maintained.

A more specific object of this invention is to improve slotted trays and elongated caps covering the slots in the trays. Each cap which constitutes a floating valve has depending means extending through a flow passage and provided with abutment means which is adapted to engage the underside of the respective tray and to limit the upward movement of the cap when it is raised relative to the tray. Another object of this invention is to improve the depending and abutment means.

Important objects of the present invention center about a tray which will ensure even distribution of both the vaporous and/or gaseous phase ans the liquid phase for effective heat and intimate mass transfer and thus will secure a more intimate contact between the countercurrently moving two phases across the whole tray surface and a more uniform efficiency of the tray. The invention aims further at enhancing the capacity of a gas and liquid contact tower equipped with the tray of the invention and achieving a wide flexibility of the tower within a broad range of practical services.

One object of the invention is to ensure, along with a proper hydraulic balance on the tray, a proper distribution of the liquid on the tray and thus a substantial reduction of the hydraulic gradient.

Another object of this invention is to lessen the otherwise great sensitivity to inevitable changes in operating conditions, which may lead to an instantaneous reduction in efficiency and even to a total breakdown of a contact column or tower.

Still another object of our invention is to provide a tray that is free of obstructions to the flow of the liquid and thus will decrease sedimentation of impurities and the necessity for the provision of frequent cleaning intervals, especially in services in which there is a tendency for solid particles to settle, which may result from destructive effects upon the materials handled.

An application filed by us as another continuation-in-part of the same parent application Ser. No. 464,982 deals with elongated caps for a slotted tray, each of which is provided with means depending from the underside of the top of the respective cap and extending to or through the respective slot in the tray. The depending means according to the referred to companion application consists of two parallel rows of longitudinally extending and longitudinally spaced members, each member being provided with abutment means or side extensions which serve to limit the upward movement of the cap when lifted by rising vapors and/or gases.

The present invention provides a single row, rather than two rows, of longitudinally spaced and transversely, rather than longitudinally, extending depending members which, too, have side extensions limiting the upward movement of a cap.

Additional objects of the invention will be apparent from the following description.

BRIEF DESCRIPTION OF THE DRAWING

Other features and many of the attendant advantages of the invention will readily be appreciated as the same becomes better understood by reference to the following detailed description of preferred embodiments, when considered in connection with the accompanying drawing in which.

DESCRIPTION OF PREFERRED EMBODIMENTS

Figure 1:
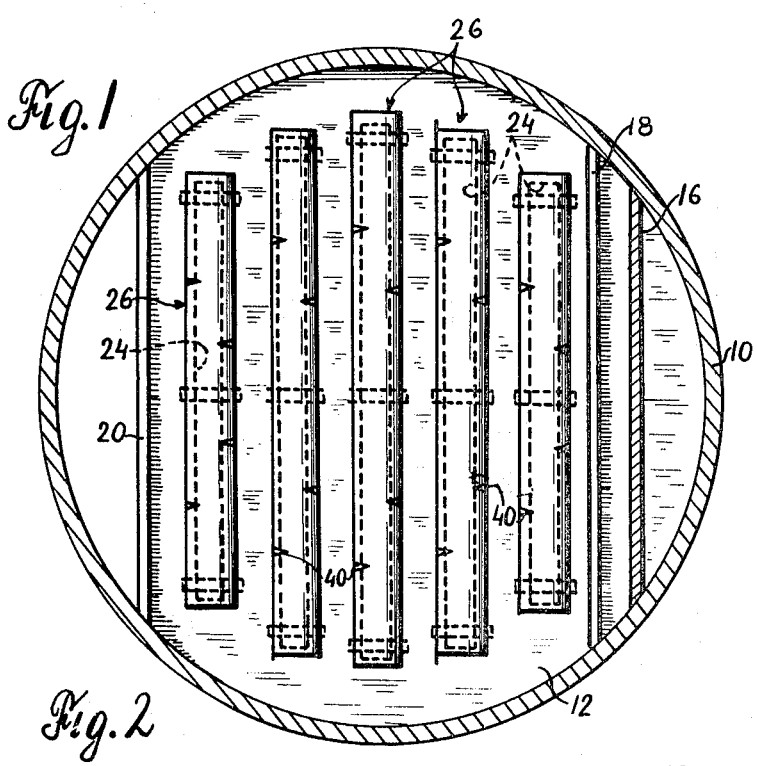
FIG. 1 is a sectional plan view of a gas or vapor and liquid contact tower embodying trays according to the present invention.
Figure 2:
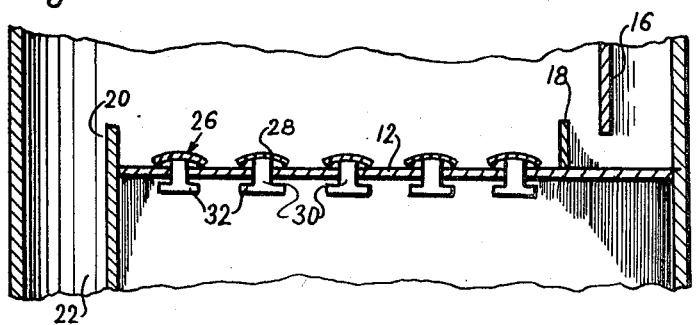
FIG. 2 is a fragmentary vertical transverse sectional view of the tower of FIG. 1.

Referring to the drawing in greater detail now, and initially to FIGS. 1 and 2, a tower 10 is provided with a series of horizontal trays such as tray 12, which are spaced apart substantially uniformly throughout the height of the tower. The trays are usually alternately arranged laterally. Liquid is directed into the space 14 above the tray 12 (see FIG. 2) either from an outside source through the wall of the tower, if the tray is the uppermost one in the system, or from a downcomer 16 of the next higher tray. The descending liquid flows over a distribution or inlet weir 18 onto and across the tray 12 and over an overflow or outlet weir 20 into a downspout 22 on the opposite side of the tower 10. An inlet weir is not in all cases essential for maintaining a liquid level on the trays.

Between the inlet and outlet weirs 18, 20 each tray is provided with parallel elongated slots 24 which allow gas or vapor to flow during the operation of the tower from below each of the trays to points above the same so as to cause intimate contact and mixing of the upwardly flowing fluid with the descending liquid as the latter laterally transverses each tray. Gas or vapor may be introduced into the tower through an inlet (not shown) positioned below the lowermost tray. The gaseous phase is emitted from the tower through an exit opening above the uppermost tray, which is not shown either.

The slots 24 are of different lengths to accommodate the cylindrical shape of the tower 10. Each of the slots is covered by an elongated cap generally designated 26, which regulates the upward flow of the gaseous phase and is shown to be somewhat longer than the respective slot and also of somewhat greater width than the slot in order to overlap the edge portions of the tray, which define the slot. Each of the caps shown in FIGS. 1 to 4 has a top 28 of a concave-convex profile. The lengthwise extending sides of each top 28 engage or almost engage the lengthwise extending edge portions of the tray when the cap or valve is in its closed position.

Each top 28 is provided on its underside with a longitudinally extending single row of longitudinally spaced depending members 30 each of which, in accordance with this invention, extends transversely of the elongation of the cap and downwardly through the respective slot. Each depending member is provided with two oppositely directed extensions 32, 32 which are spaced a predetermined distance from the top 28 of the cap 26 and from the tray 12 and engage when the cap rises the underside of the tray to act as abutment means limiting the upward movement of the valve.

Figure 5:
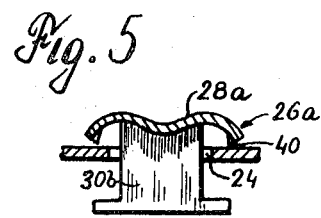
FIGS. 5 and 6 are vertical transverse sections similar to that of FIG. 3, showing two modifications of the cap of FIGS. 1 to 4.

FIG. 5 shows a cap or valve 26a whose top 28a has a convexo-concave-convexo or a substantially wavy profile. Depending from the top are members 30b which again extend transversely of the elongation of the respective slot 24 and cap 26a.

Figure 6:
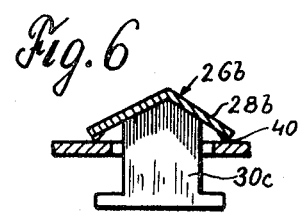

The modification of the cap 26b, shown in FIG. 6, involves a rooflike cap top 28b.

Figure 7:
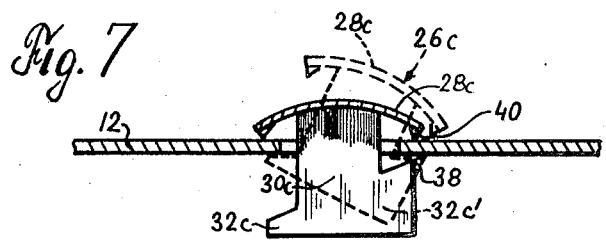
FIG. 7 is similar to FIGS. 3, 5 and 6 and shows another cap modification.

In FIG. 7 a cap 26c is shown which is provided with depending members 30c each of which, in turn, is provided with extensions 32c, 32c'. The extensions are asymmetrically shaped with respect to a plane perpendicular to the depending members and passing through the longitudinal axis of the cap.

Figure 8:
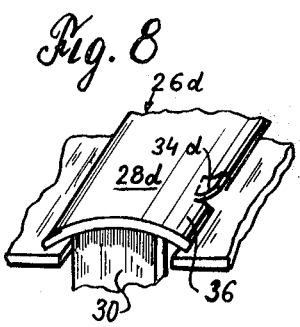
FIG. 8 is a fragmentary perspective view of still another cap construction.
Figure 3:
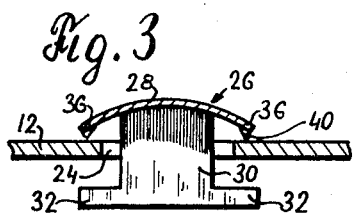
FIG. 3 is an enlarged vertical transverse section through a tray portion controlled by one of the caps or valves shown in FIGS. 1 and 2.
Figure 4:
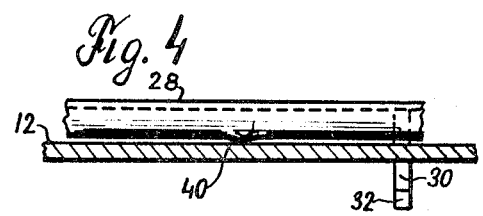
FIG. 4 is a side elevational view of the cap of FIG. 3.

In the cap 26d shown in FIG. 8, there are narrow tongues 34d cut in the side portions 36 of the top 28d of the cap. Each tongue is formed by the material between two adjacent inwardly directed cuts. The tongues are slightly bent in an upward direction and make for permanent and invariable passages for the ascending fluid, available prior to the time that the differential pressure from underneath to above the tray is effective and starts lifting the valve.

In operation, when anyone of the caps 26, 26a, 26b, 26c, and 26d (FIGS. 1 to 6 and 8) is in its closed position, the two longitudinal side portions of the top of each of the caps (see the side portions 36, 36 of the top 28 in FIG. 4) overlap the edge portions of the tray, which define the respective flow passage 24, and engage or nearly engage the top surface of the tray so as to close or nearly close the flow passage.

Reverting to FIG. 7, it will be understood that upon an increase of the differential gas pressure from below to above the tray 12, the cap 26c rises until the extension 32c' strikes, and the edge 38 of the extensions 32c' engages, the underside of the tray. The cap 26c is caused to rock or tilt about the edge 38 as a fulcrum, which raises the opposite side of the top 28c away from the tray. Caps such as shown in FIG. 7 are used for a flow of liquid on a tray from the low side of the top of the tilted cap top toward the high side of the cap top. On the side of the more highly raised cap top there is no obstruction to the ascension of vapors and/or gases. There will be a strong turbulent movement of the liquid on the tray. Fluid ascending from below the tray will be more thoroughly mixed with the liquid. Although the required intimate contact between both phases is mainly caused by fine liquid drops suspended in the vapor or gas phase, the referred to turbulence is important in that bubbles of vapor and/or gas entrained by the liquid counteract a tendency of the liquid toward stagnancy.

Referring to FIGS. 1 and 3 to 7, there are shown at 40 cut and bent formations in the side portions of the top of the caps. The cuts may be made, for instance, along two short, inwardly directed converging lines (see FIG. 1). Minimum initial passages are created in the caps, while still in their rest position, by slightly bending down a corner or an edge portion of the cut places. Such cut and bent formations act as supports for the caps and simultaneously prevent the caps from sticking to the trays when covered with sticky asphaltic material which may develop during operation. The formations 40 make it possible for the caps to be easily lifted in case asphaltic or similar material is present on the surfaces of the trays.

It will be seen that with the construction of the fluid contact tray here disclosed the valving is done by elongated slots and elongated caps of greater length than width. The ratio between length and width of the cap tops is according to the invention about 10 to 30 to 1. With known constructions using a similar ratio, transversely extending elements were used which connected the caps or valves with each other and greatly restricted the free movement of the valves. We succeeded in doing away with such strengthening but the freedom of the valve movement restricting elements by providing such shapes for the top of each cap as will ensure sufficient rigidity without any added reinforcing means. The top of a cap, according to the invention, is generally either of an arcuate or angular shape, when viewed in cross section. More broadly, at least a portion of the top of our cap has an outwardly directed profile.

ADVANTAGES

It is believed that the fluid contact tray of our invention and the construction and operation of preferred forms of the tray for practicing the invention as well as the many advantages of the invention will be fully understood from the foregoing detailed description. Some of these advantages are reviewed hereinafter.

The caps of the invention are constructed and arranged so as to operate as highly stabilized float valves with minimum sensitivity to varying operating conditions and maximum resistance to undesirable oscillations and pressure fluctuations. Essentially, this is accomplished by elongated slots of much greater length than width, covered by elongated caps. It has been proven that the moment of inertia to the transverse axis of the caps increases with the increase in length of the caps.

The arcuate, rooflike, or the like profile of the tops of the present caps affords great rigidity and thus permits the use of a length and width ratio of about between 10 to 1 and 30 to 1 and at the same time increases the stability in floating positions.

Our tray ensures even distribution of the countercurrently moving two phases, intimate mixing of the two phases, and a wide flexibility of the tower within a broad range of uses. The kinetic energy of the ascending vapors and/or gases is absorbed by the liquid mass and since, in addition, the tray of the invention is free of any obstacles to the liquid flow no sedimentation of foreign matter takes place.

The present tray is of small height, which increases the free operating spaces between the trays and reduces substantially the carrying along of liquid drops by the gaseous phase.

We claim:

1. In a tower for effecting intimate contact between a rising gaseous and/or vaporous phase and a descending liquid phase, the improvement which comprises
    A. a tray member having a plurality of elongated slots and
    B. a plurality of elongated symmetrical caps for said slots, each of said caps having an outwardly directed top surface profile, covering at least one of said slots and being reciprocally movable relative to the respective slot,
        a. each of said caps having a lower surface and a single row of a plurality of longitudinally spaced individual members depending from the lower surface between the ends thereof,
            1. each of said depending members extending transversely of the elongation of the respective cap and downwardly from said lower surface through the respective slot, 2. said depending members having abutment means spaced from the underside of said tray and adapted to engage the lower surface of said tray when lifted by said rising phase so as to limit the upward movement of the respective cap.

2. In the tower according to claim 1, wherein the top of each cap has a length and width ratio between 10 to 1 and 30 to 1.

3. The tower according to claim 2, wherein said top has a substantially rooflike profile.

4. The tower according to claim 2, wherein said top portion has a substantially concavo-convex profile.

5. In the tower according to claim 1, the abutment means of a depending member being constituted by opposing side extensions, said side extensions being asymmetrically shaped so as to produce a pivoting effect upon the respective cap when exposed to the pressure of said rising phase.

6. In the tower according to claim 1, each cap having a top, side portions of said top having inwardly directed peripheral cuts, the material between two adjacent cuts forming tongues bent in an upward direction, said tongues constituting permanent passages for said rising phase.

7. In the tower according to claim 1, each cap having a top, side portions of said top having inwardly directed short peripheral cuts, the material between two adjacent cuts being bent downwardly, the bent material serving to space the respective cap from said tray member and providing permanent passages for said rising phase.

* * * * *